(12) United States Patent
Ben-Yehuda et al.

(10) Patent No.: US 8,156,503 B2
(45) Date of Patent: Apr. 10, 2012

(54) SYSTEM, METHOD AND COMPUTER PROGRAM PRODUCT FOR ACCESSING A MEMORY SPACE ALLOCATED TO A VIRTUAL MACHINE

(75) Inventors: Shmuel Ben-Yehuda, Haifa (IL); Zorik MacHulsky, Gesher HaZiv (IL); Julian Satran, Atlit (IL); Edward J. Seminaro, Milton, NY (US); Leah Shalev, Zichron-Yaakov (IL); Ilan Shimony, Haifa (IL)

(73) Assignee: International Business Machines Corporation, Armonk, NY (US)

(*) Notice: Subject to any disclaimer, the term of this patent is extended or adjusted under 35 U.S.C. 154(b) by 1067 days.

(21) Appl. No.: 12/029,475

(22) Filed: Feb. 12, 2008

(65) Prior Publication Data

US 2009/0204960 A1   Aug. 13, 2009

(51) Int. Cl.
*G06F 9/46* (2006.01)
*H04L 29/06* (2006.01)

(52) U.S. Cl. .................... 718/104; 713/156; 713/165

(58) Field of Classification Search .............. 718/104, 718/1, 108; 713/150, 155, 161, 180; 711/170
See application file for complete search history.

(56) References Cited

U.S. PATENT DOCUMENTS

| | | | |
|---|---|---|---|
| 6,286,104 B1* | 9/2001 | Buhle et al. | 726/4 |
| 7,318,212 B2 | 1/2008 | Amit et al. | |
| 2002/0103884 A1* | 8/2002 | Duursma et al. | 709/219 |
| 2003/0145223 A1* | 7/2003 | Brickell et al. | 713/201 |
| 2004/0010682 A1* | 1/2004 | Foster et al. | 713/156 |
| 2004/0111644 A1* | 6/2004 | Saunders et al. | 713/202 |
| 2005/0108521 A1* | 5/2005 | Silhavy et al. | 713/156 |
| 2006/0251109 A1 | 11/2006 | Muller et al. | |
| 2007/0089111 A1* | 4/2007 | Robinson et al. | 718/1 |
| 2007/0106986 A1* | 5/2007 | Worley, Jr. | 718/1 |
| 2007/0156999 A1* | 7/2007 | Durham et al. | 711/170 |
| 2007/0169172 A1 | 7/2007 | Backes et al. | |
| 2007/0180447 A1* | 8/2007 | Mazzaferri et al. | 718/1 |
| 2007/0180450 A1* | 8/2007 | Croft et al. | 718/1 |
| 2007/0186212 A1* | 8/2007 | Mazzaferri et al. | 718/1 |

OTHER PUBLICATIONS

MC/OS Multicomputer Operating Environment Source: http://www.mc.com/literature/literature_files/mcos-ds.pdf.

* cited by examiner

*Primary Examiner* — Thomas Lee
*Assistant Examiner* — Phil Nguyen

(57) ABSTRACT

A method for accessing a memory space allocated to a virtual machine, the method includes: receiving a request from the virtual machine to generate, for another virtual machine, a memory credential associated with a certain memory space allocated to the virtual machine; generating, in response to the request, a cryptographically signed credential; sending the cryptographically signed credential to the other virtual machine; receiving from the other virtual machine an access request to access at least one memory entry within the certain memory space; and accessing the at least one memory entry, if the access request complies with the memory credential.

17 Claims, 5 Drawing Sheets

SYSTEM, METHOD AND COMPUTER PROGRAM PRODUCT FOR ACCESSING A MEMORY SPACE ALLOCATED TO A VIRTUAL MACHINE

FIELD OF THE INVENTION

The present invention relates to methods, systems and computer program products for accessing a memory space allocated to a virtual machine.

BACKGROUND OF THE INVENTION

Many modern computerized systems support virtual machines. The exchange of information between one virtual machine to the other can be very complex and resource consuming. A hypervisor based information transfer can require context switching to and from hypervisor mode and page flipping operations or copy operations. Another way of performing information transfer is known as a remote data memory access (RDMA) based information transfer. This information transfer is characterized by a "heavy" memory registration procedure, transport overhead, high memory access time as RDMA adapters are connected to a peripheral bus), and weak protection.

There is a need to provide an efficient system, method and computer program product that will enable exchange of information between a virtual machine to another virtual entity or to an IO device.

SUMMARY OF THE PRESENT INVENTION

A method for accessing a memory space allocated to a virtual machine, the method includes: receiving a request from the virtual machine to generate, for another virtual machine, a memory credential associated with a certain memory space allocated to the virtual machine; generating, in response to the request, a cryptographically signed credential; sending the cryptographically signed credential to the other virtual machine; receiving from the other virtual machine an access request to access at least one memory entry within the certain memory space; and accessing the at least one memory entry without performing a context switch, if the access request complies with the memory credential.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Methods, systems and computer program products for exchanging information between a virtual machine and other entities such as another virtual machine or another component are provided. The other component is not directly used by the virtual machine so it has to utilize an information exchange mechanism in order to access a memory space allocated to the virtual machine.

A virtual machine can allow another entity (such as another virtual machine) to access a memory space that is allocated to the virtual machine. A cryptographically signed credential is generated by an intermediate entity in order to facilitate such an access. The cryptographically signed credential can be used when the other entity wishes to access that memory space. The access can be performed without a context switch, without interacting with a hypervisor or with an operating system and without needing dedicated RDMA adapters.

Figure 1:
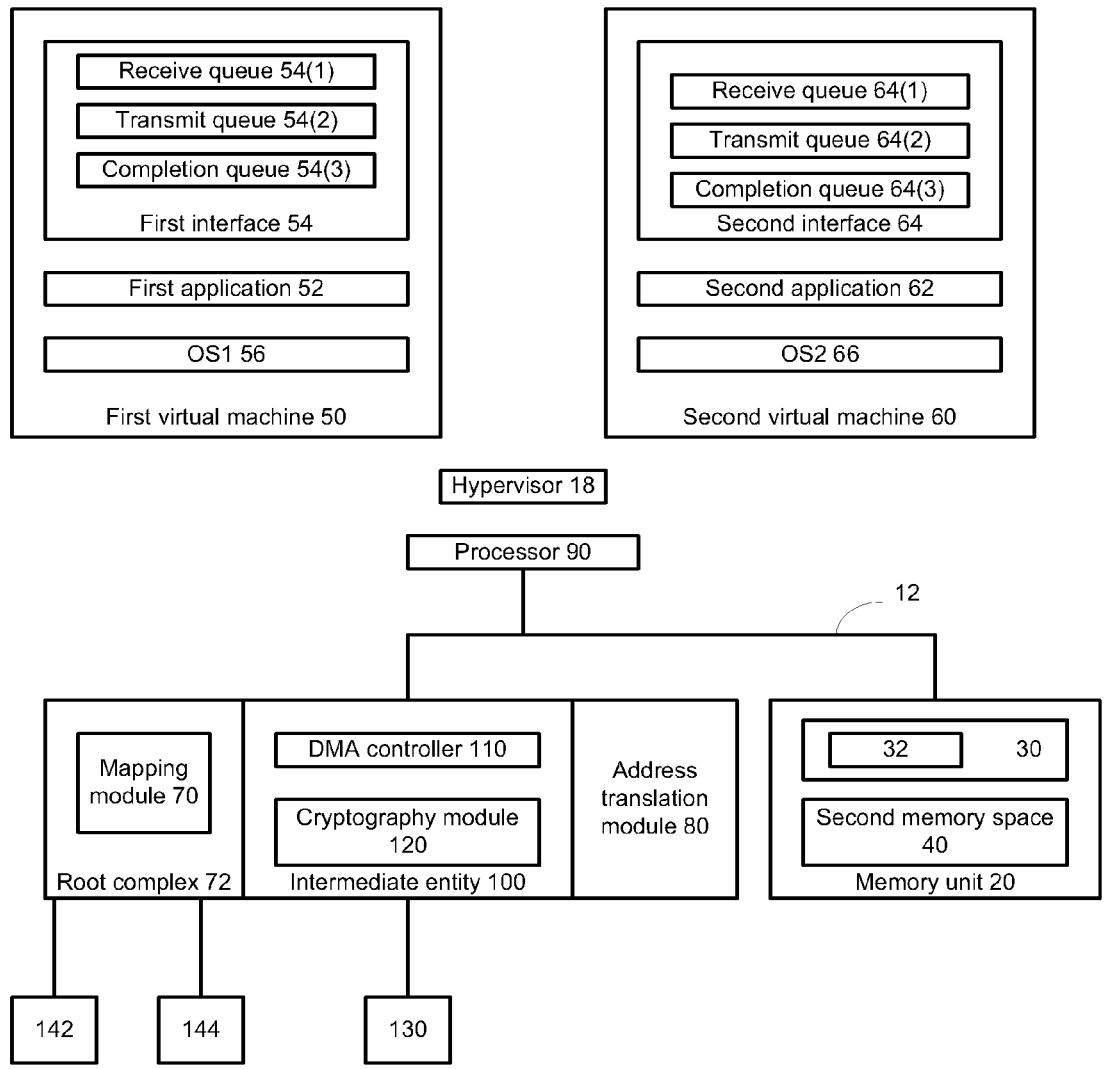
FIG. 1 illustrates a system according to an embodiment of the invention.
Figure 2:
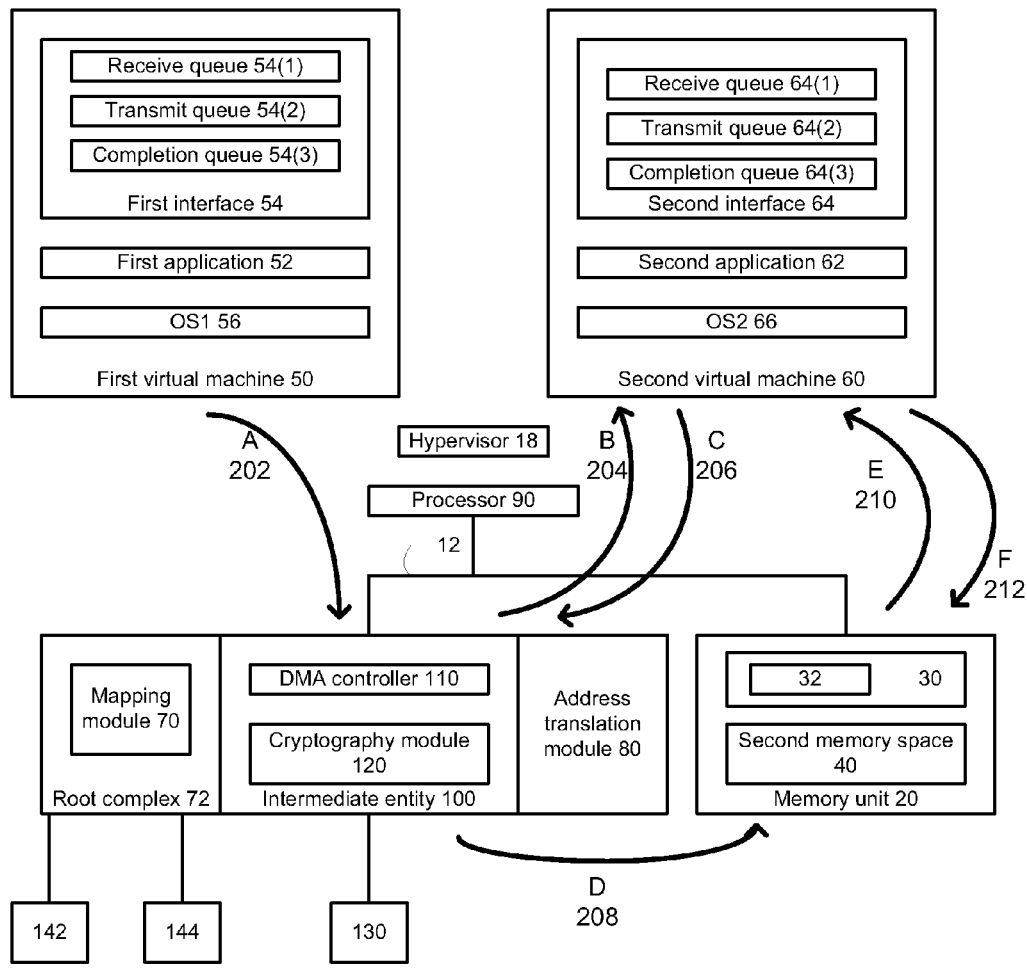
FIG. 2 illustrates a system as well as sample signal that are transmitted from one entity to another according to an embodiment of the invention.

FIG. 1 illustrates system 10 according to an embodiment of the invention. FIG. 2 illustrates system 10 as well as sample signal 202, 204, 206, 210 and 212 that are transmitted from one entity to another according to an embodiment of the invention.

System 10 includes memory unit 20, intermediate entity 100, processor 90, bus 12, mapping module 70, components 142 and 144, address translation module 80 and system interface 130. Intermediate entity 100 includes direct memory access (DMA) controller 110 and cryptography module 120.

System interface 130 can be used for exchanging information with another system. System interface 130 can be used for communication with virtual machines that reside on other systems.

System 10 hosts hypervisor 18, multiple operating systems (such as first operating system OS1 56 and second operating system OS2 66) and multiple applications such as first application 52 and second application 54. First operating system OS1 56 and first application 52 form first virtual machine 50. Second operating system OS2 66 and second application 62 form second virtual machine 60. First virtual machine 50 interfaces with intermediate entity 100 via first interface 54. Second virtual machine 60 interfaces with intermediate entity 100 via second interface 64.

Conveniently, first interface 54 includes transmit queue 54(1), receive queue 54(2) and a completion queue 54(3) while second interface 64 includes transmit queue 64(1), receive queue 64(2) and a completion queue 64(3). Completion queues 54(3) and 64(3) include indications about a completion of operations such as a completion of a DMA operation. Transmit and receive queue are used to exchange information, requests and cryptographically signed credential. These queues can be polled, monitored or accessed in various manners including but not limited to polling or to asynchronous event driven monitoring.

Memory unit 20 includes multiple memory entries that are arranged in multiple "physical" memory pages. Physical memory spaces can be (temporarily or not) allocated to each of the virtual machines. The virtual machine are exposed to virtual memory spaces and the address translation between the virtual memory spaces of each virtual machine and the physical address space of memory unit 20 (in case of DMA operations) can be done by an address translation module. For simplicity of explanation FIG. 1 illustrates memory unit at including first memory space 30 and second memory space 40.

First memory space 30 (or more specifically a virtual memory space that is mapped to a physical memory space of memory unit 20) is allocated to first virtual machine 50. Second memory space 40 is allocated to second virtual machine 60. It is noted that memory unit 20 can include more than two memory spaces and that the size of the memory spaces can differ from each other. It is further noted that a memory space can include consecutive memory entries but this is not necessarily so and it can include non-consecutive memory entries.

Each one out of the first and second virtual machines 50 and 60 can decide to enable another entity to access one or more entries of the memory space that was allocated to them. This allows to share information between virtual machines, as well as enable a components (such as but not limited to components 142 and 144) that are not directly used by a certain virtual machine to access information of that certain virtual machine.

Assuming that first virtual machine 50 decides that second virtual machine 60 should be allowed to access a certain memory space (such as certain memory space 32) included within first memory space 30. This certain memory space can include one or more memory entries; it can be equal to first memory space 30 or can be only a portion of first memory space.

Following this decision, first virtual machine 50 sends a request (to intermediate entity 100) to generate for another entity (such as second virtual machine 60) a memory credential associated with certain memory space 32. The request can include an address range, identity of the other entity, and access permissions. The request can have the following format: Request={address range, identity of other entity, access permissions}. The request is denoted A 202 in FIG. 2. The request can be stored at transmit queue 54(1).

Intermediate entity 100 (especially cryptography module 120) receives the request and generates (in response to the request) a cryptographically signed credential. The cryptographically signed credential can be generated in various known manners, including key based methods. Conveniently at least a portion of the request is encrypted to provide the cryptographically signed credential. It is noted that the cryptographically signed credential can include non-encrypted parts such as not-encrypted portions of the request.

Intermediate entity 100 then sends the cryptographically signed credential to second virtual machine 60. The cryptographically signed credential is denoted B 204 in FIG. 2. The cryptographically signed credential can be stored at receive queue 64(1).

Systems and methods for generating a cryptographically signed credential are illustrated in U.S. patent application Ser. No. U.S. Ser. No. 11/333,066, filed on Jan. 11, 2006, titled "A METHOD AND SYSTEM FOR MEMORY PROTECTION AND SECURITY USING CREDENTIALS", and in U.S. patent application Ser. No. 11/333,716, filed on Jan. 11, 2006, titled "A METHOD AND SYSTEM FOR PROTECTION AND SECURITY of IO DEVICES USING CREDENTIALS", both being incorporated by reference.

It is noted that the mentioned above process can replace two IB/iWRARP operations including a RegisterMemoryRegion operation that requires context switching and consumes a large amount of computational resources.

At any point of time that follows the reception of the cryptographically signed credential second virtual machine 60 can decide to access one or more memory entries of certain memory space 32. This decision is followed by generating and sending (to intermediate entity 100) an access request that can include access information as well as the cryptographically signed credential. The access request is denoted C 206 in FIG. 2.

Intermediate entity 100 can authenticate the cryptographically signed credential and determine whether such an access should be permitted. If the access request includes a valid cryptographically signed credential and the access request complies with the access permissions defined by first virtual machine 50 then the requested access is executed. The address information sent to first memory 30 during the DMA access is denoted D 208 in FIG. 2. Information retrieved from memory unit 20 during a read operation is denoted E 210 in FIG. 2. Information written to memory unit 20 during a write operation is denoted F 212 in FIG. 2.

Conveniently, intermediate entity 100 and especially DMA controller 110 performs one or more DMA operations. The DMA operation can include address translation (from virtual machine address to physical memory unit address) by address translation module 80.

First and second memory spaces 30 and 40 as well as certain memory space 32 are mapped to multiple memory pages. In order to efficiently utilize memory unit 20 and in order to prevent context switching or complex page flipping operations, a sequence of one or more DMA operations involves pinning at least one physical memory page associated with the at least one memory entry during the DMA operation. Once the access request is fulfilled the at least one memory page can be unpinned. Systems and methods for pinning memory pages are illustrated in U.S. patent titled "A METHOD AND SYSTEM FOR MEMORY ADDRESS TRANSLATION AND PINNING" assigned to the same assignee as the assignee of this patent application. It is noted that a DMA operation involves a transfer of a certain amount of information.

The mentioned above process requires the second virtual machine 60 to store the cryptographically signed credential. There are entities, such as components 142 and that are prevented from communicating such cryptographically signed credential. For example, a legacy system can include components that communicate with each other by using a communication protocol that can not be easily adapted to convey a cryptographically signed credential. For example, components 142 and 144 can be connected over PCI bus and exchange information by using a unique PCI identifier. When such a PCI compliant component requests to perform a DMA operation it sends its unique PCI identifier.

In order to enable such components to access a memory space that is allocated to a virtual machine that does not directly use these devices it is necessary to maintain a mapping between these components and their cryptographically signed credentials. Referring to FIG. 1, mapping module 70 can store such a map. The map can be generated by an IO hosting partition. The IO hosting partition can be a part of intermediate entity 100 but this is not necessarily so.

Mapping module 70 can be included within a root complex device 72 that connects processor 90 and memory unit 20 to one or more PCI express compliant components via a switch fabric (not shown). In this case mapping module 70 can interact with PCI express agents installed in components 142 and 144. Mapping module 70 can map a unique identifier such as a PCI express requester ID (bus/device/function/address/length) to a cryptographically signed credential assigned to these components. The root complex that includes mapping module 70 maintains a state (cryptographically signed credentials) representing a memory space which can be accessed by a given PCI express agent. A cryptographically signed credential is forwarded to intermediate entity 100 together with a memory entry address and length received from the PCI express agent.

If, for example, first virtual machine 50 decides to allow component 142 to access certain memory space 32 (or another portion of first memory space 30) then it sends a request (to intermediate entity 100) to generate for component 142 a memory credential associated with certain memory space 32. The request can include an address range, identity of component 142, and access permissions.

It is noted that different virtual machines and different components can be allowed to access different memory spaces of first virtual machine 50 and just for simplicity of explanation is was assumed that second virtual machine 60 and component 142 should access the same certain memory space 32.

Intermediate entity 100 and especially cryptography module 120 receive the request and generates (in response to the request) a cryptographically signed credential. The cryptographically signed credential can be generated in various known manners, including key based methods.

Intermediate entity 100 then sends the cryptographically signed credential to mapping module 70. Mapping module 70 stores mapping information that maps this cryptographically signed credential to component 142.

Component 142 can decide to access one or more memory entries of certain memory space 32. This decision is followed by generating and sending (to mapping module 70) an access request that can include access information as well as a unique identifier of component 142.

Mapping module 70 sends the access information as well as the cryptographically signed credential associated with component 142 to intermediate entity 100.

Intermediate entity 100 can authenticate the cryptographically signed credential and determine whether such an access should be permitted. Typically, the cryptographically signed credential is authenticated and if it includes information pertaining to an access that should be allowed (according to the memory credential defined by first virtual machine 50) the requested access is executed. The access can include configuring DMA controller 110 to perform one or more DMA operations in order to fulfill the access request.

In the following figures the virtual machine that determines to allow another entity to access a memory space is termed "first virtual machine" and the other virtual machine is termed "second virtual machine".

Figure 3:
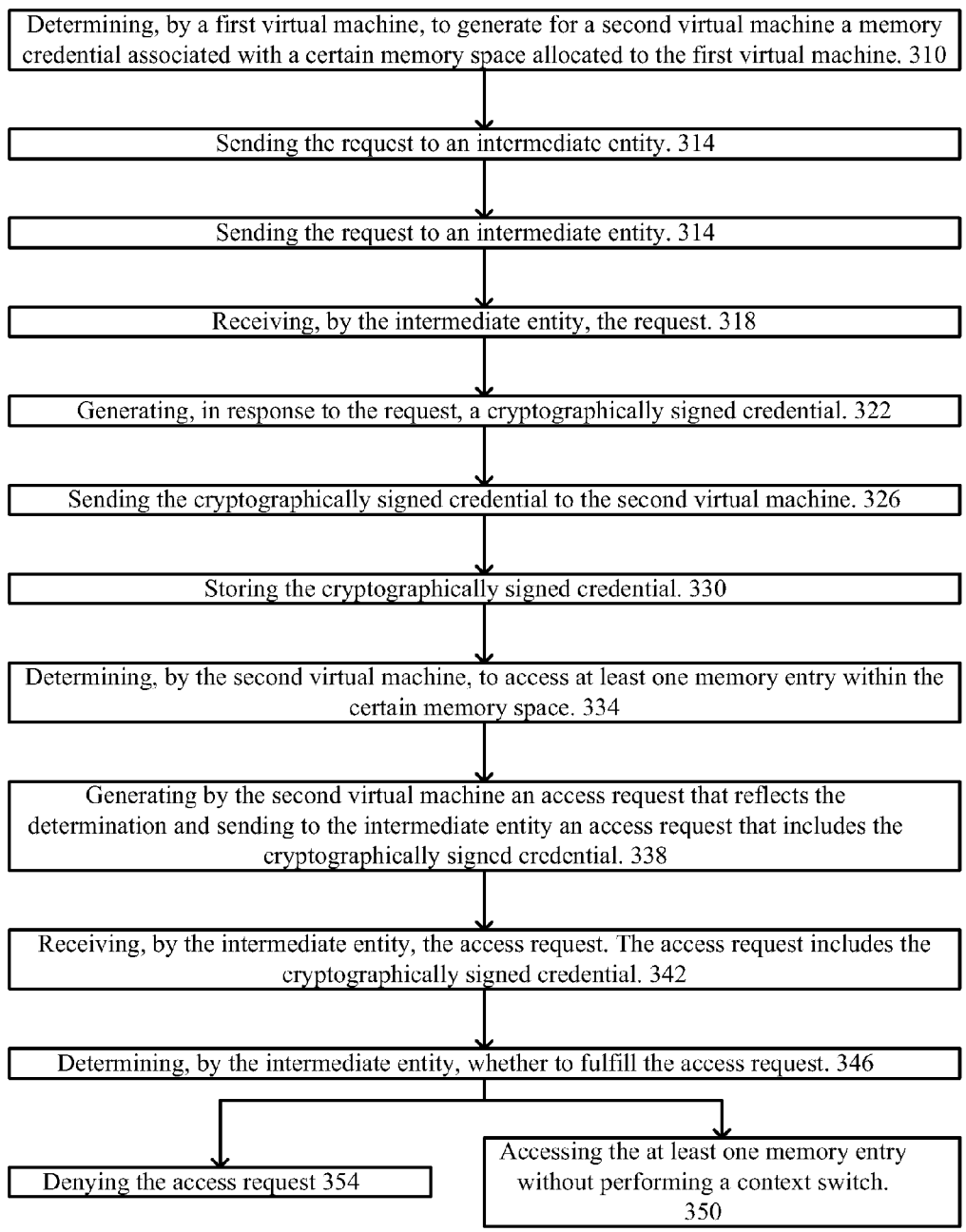
FIG. 3 illustrates a method according to an embodiment of the invention.

FIG. 3 illustrates a flow chart of method 300 according to an embodiment of the invention.

System 300 starts by stage 310 of determining, by a first virtual machine, to generate for a second virtual machine a memory credential associated with a certain memory space allocated to the first virtual machine. It is noted that the terms "first" and second" are merely used in order to differentiate one virtual machine from another. Referring to the example set fourth in FIG. 1, first virtual machine 50 can decide to allow second virtual machine 60 to access one or more memory entries of first memory space 30 and generate a request and second virtual machine 60 can decide to allow first virtual machine 50 to access one or more memory entries of second memory space 40 and generate a request. It is further noted that yet another virtual machine (for example a virtual machine not residing on system 10) can generate a request in relation to either one of first and second virtual machines or can be allows to access first or second memory spaces or both.

Stage 310 is followed by stage 314 of sending the request to an intermediate entity. Referring to the example set fourth in FIG. 1, the request is sent to intermediate entity 100 and especially to cryptography module 120 within intermediate entity 100.

Stage 314 is followed by stage 318 of receiving, by the intermediate entity, the request.

Stage 318 is followed by stage 322 of generating, in response to the request, a cryptographically signed credential.

Stage 322 is followed by stage 326 of sending the cryptographically signed credential to the second virtual machine.

Stage 326 is followed by stage 330 of storing the cryptographically signed credential.

Stage 330 is followed by stage 334 of determining, by the second virtual machine, to access at least one memory entry within the certain memory space.

Stage 334 is followed by stage 338 of generating by the second virtual machine an access request that reflects the determination and sending to the intermediate entity an access request that includes the cryptographically signed credential. Stage 338 can include queuing within a transmit queue the access request and the cryptographically signed credential.

Stage 338 is followed by stage 342 of receiving, by the intermediate entity, the access request. The access request includes the cryptographically signed credential.

Stage 342 is followed by stage 346 of determining, by the intermediate entity, whether to fulfill the access request. The determining can include authenticating the cryptographically signed credential and determining that the access request complies with the memory credential provided by the first virtual machine.

If the answer is positive stage 346 is followed by stage 350 of accessing the at least one memory entry conveniently without performing a context switch. Stage 350 includes performing one or more DMA operations.

Conveniently, stage 350 is executed without interacting with an operating system or with a hypervisor. According to an embodiment of the invention stage 350 includes pinning at least one physical memory page associated with the at least one memory entry during an access of the second virtual machine and optionally unpinning the at least one physical page after the access ends. Stage 350 also includes address translation. It is noted that a hypervisor can be required to provide a translation between a virtual machine address and a physical address, if such a translation does not exist.

If the answer is negative the access request is denied, as illustrated by stage 354.

It is noted that a completion indication or a failure indication can be generated and sent to the completion queue of the second virtual machine.

Conveniently all of the mentioned above stages are executed by system 10 but this is not necessarily so. For example, if the first virtual machine and the second virtual machine reside on different systems, then both systems have to cooperate in order to complete method 100. It is noted that even in such a scenario the operating systems and hypervisors hosted by these systems are not involved in the process.

Figure 4:
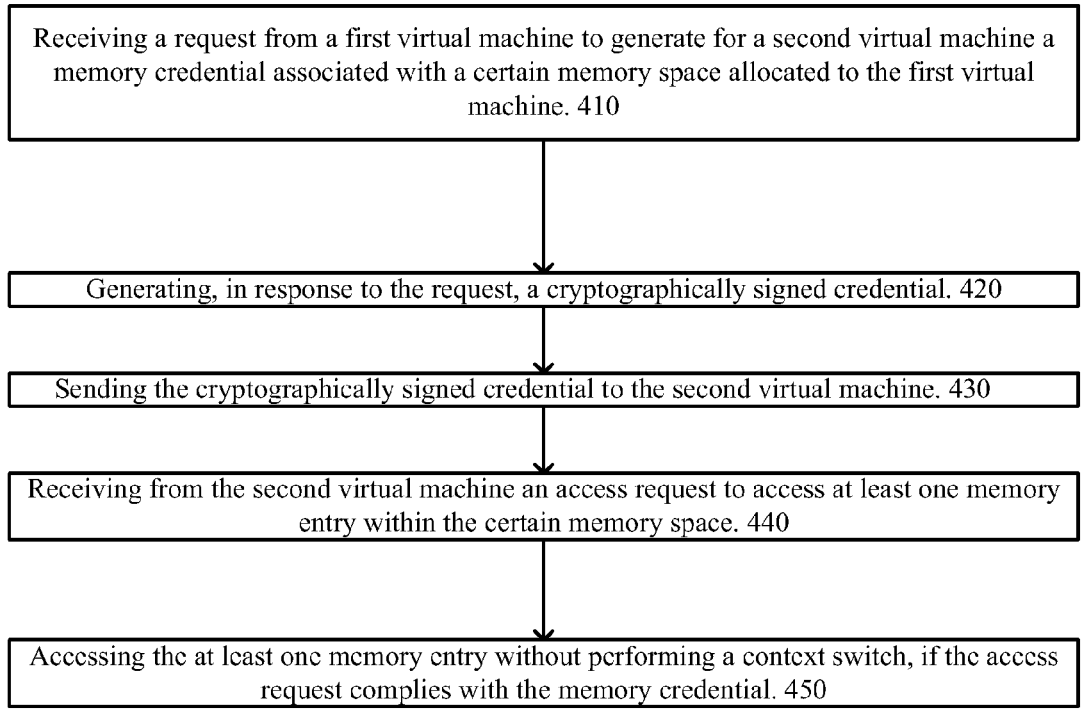
FIG. 4 illustrates a method according to another embodiment of the invention.

FIG. 4 illustrates a flow chart of method 400 according to an embodiment of the invention.

System 400 starts by stage 410 of receiving a request from a first virtual machine to generate for a second virtual machine a memory credential associated with a certain memory space allocated to the first virtual machine.

It is noted that the first and second virtual machines can reside on the same system or reside in different systems. It is also noted that much more than two virtual machines can participate in method 400.

Stage 410 is followed by stage 420 of generating, in response to the request, a cryptographically signed credential.

Stage 420 is followed by stage 430 of sending the cryptographically signed credential to the second virtual machine. The cryptographically signed credential is sent through the intermediate entity. Conveniently, even if the first and second virtual machines are hosted by different systems they are not aware of this.

Stage 430 is followed by stage 440 of receiving from the second virtual machine an access request to access at least one memory entry within the certain memory space.

Stage 440 is followed by stage 450 of accessing the at least one memory entry conveniently without performing a context switch, if the access request complies with the memory credential.

Conveniently all of the mentioned above stages are executed by an intermediate entity such as intermediate entity 100 of FIG. 1.

Conveniently, stage 450 is executed without interacting with an entity selected out of an operating system and a hypervisor. According to an embodiment of the invention stage 450 includes pinning at least one physical memory page associated with the at least one memory entry during an access of the second virtual machine and optionally unpinning the at least one physical page after the access ends.

Figure 5:
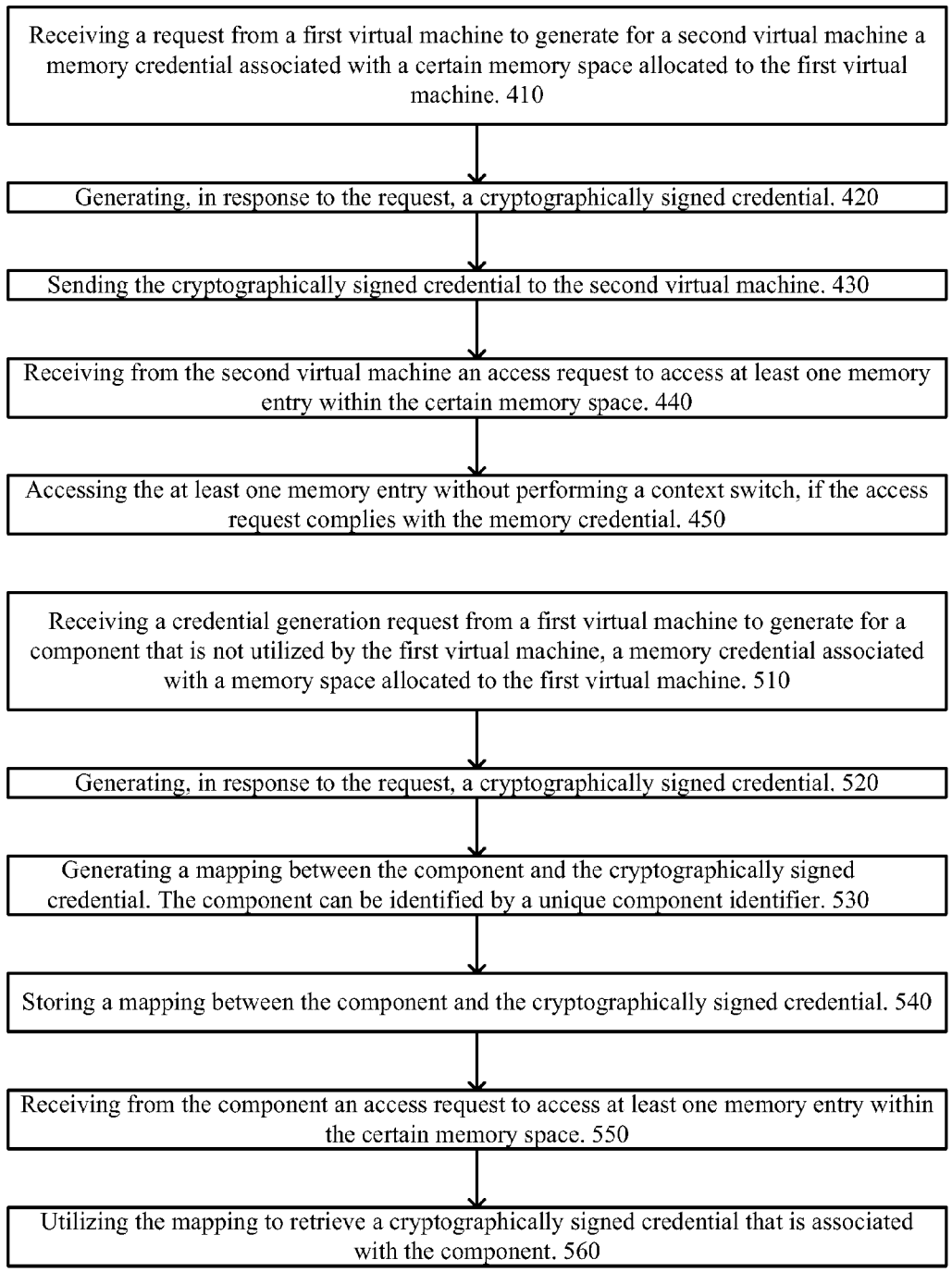
FIG. 5 illustrates a method according to a further embodiment of the invention.

FIG. 5 illustrates a flow chart of method 500 according to an embodiment of the invention.

Method 500 includes stages 410, 420, 430, 440 and 450 as well as additional stages such as stages 510, 520, 530, 540 and 550. These stages can be executed in a sequential manner or in a parallel manner.

Stage 510 includes receiving a credential generation request from a first virtual machine to generate for a component that is not directly utilized by the first virtual machine, a memory credential associated with a memory space allocated to the first virtual machine.

Stage 510 is followed by stage 520 of generating, in response to the request, a cryptographically signed credential.

Stage 520 is followed by stage 530 of generating a mapping between the component and the cryptographically signed credential. The component can be identified by a unique component identifier.

Stage 530 is followed by stage 540 of storing a mapping between the component and the cryptographically signed credential. Conveniently, the mapping can be generated by an IO hosting partition.

Stage 540 is followed by stage 550 of receiving from the component an access request to access at least one memory entry within the certain memory space.

Stage 550 is followed by stage 560 of utilizing the mapping to retrieve a cryptographically signed credential that is associated with the component.

The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for accessing a memory space allocated to a virtual machine, the method comprises:
   receiving, by an intermediate entity, a request from the virtual machine to generate, for another virtual machine, a memory credential associated with a certain memory space allocated to the virtual machine;
   generating, by the intermediate entity, in response to the request, a cryptographically signed credential;
   sending, by the intermediate entity the cryptographically signed credential to the other virtual machine;
   receiving, by the intermediate entity from the other virtual machine an access request to access at least one memory entry within the certain memory space;
   accessing the at least one memory entry, if the access request complies with the memory credential; and
   pinning at least one physical memory page associated with the at least one memory entry during an access of the other virtual machine.

2. The method according to claim 1 comprising performing the accessing without performing an operation selected from a list consisting of: context switch, interacting with an operating system and interfacing with a hypervisor.

3. The method according to claim 1 wherein the virtual machine and the other virtual machines reside on different machines.

4. The method according to claim 1 further comprising:
   receiving a credential generation request from the virtual machine to generate for a component that is not directly utilized by the virtual machine, a memory credential associated with a memory space allocated to the virtual machine;
   generating, in response to the request, a cryptographically signed credential;
   storing a mapping between the component and the cryptographically signed credential;
   receiving from the component an access request to access at least one memory entry within the certain memory space;
   utilizing the mapping to retrieve a cryptographically signed credential that is associated with the component.

5. The method according to claim 1 comprising generating the mapping between the component and the cryptographically signed credential; wherein the component is identified by a unique component identifier.

6. A computer program product comprising a computer usable medium including a computer readable program, wherein the computer readable program when executed on a computer causes the computer to:
receiving, by an intermediate entity, a request from the virtual machine to generate, for another virtual machine, a memory credential associated with a certain memory space allocated to the virtual machine;
generating, by the intermediate entity, in response to the request, a cryptographically signed credential;
sending, by the intermediate entity the cryptographically signed credential to the other virtual machine;
receiving, by the intermediate entity from the other virtual machine an access request to access at least one memory entry within the certain memory space;
accessing the at least one memory entry, if the access request complies with the memory credential; and
pinning at least one physical memory page associated with the at least one memory entry during an access of the other virtual machine.

7. The computer program product according to claim 6, wherein the computer readable program when executed on a computer causes the computer to access without performing an operation selected from a list consisting of: context switch, interacting with an operating system and interfacing with a hypervisor.

8. The computer program product according to claim 6, wherein the virtual machine and the other virtual machines reside on different machines.

9. The computer program product according to claim 6, wherein the computer readable program when executed on a computer causes the computer to: receive a credential generation request from the virtual machine to generate for a component that is not directly utilized by the virtual machine, a memory credential associated with a memory space allocated to the virtual machine; generate, in response to the request, a cryptographically signed credential; store a mapping between the component and the cryptographically signed credential; receive from the component an access request to access at least one memory entry within the certain memory space; and utilize the mapping to retrieve a cryptographically signed credential that is associated with the component.

10. The computer program product according to claim 9, wherein the computer readable program when executed on a computer causes the computer to generate the mapping between the component and the cryptographically signed credential; wherein the component is identified by a unique component identifier.

11. A system for accessing a memory space allocated to a virtual machine, the system is adapted to host the virtual machine; the system comprises:
a memory unit; and
an intermediate entity;
the intermediate entity comprises:
a direct memory access controller; and
a cryptography module;
wherein the intermediate entity is adapted to:
receive a request from the virtual machine to generate, for another virtual machine, a memory credential associated with a certain memory space allocated to the virtual machine;
generate, in response to the request, a cryptographically signed credential;
send the cryptographically signed credential to the other virtual machine; receive from the other virtual machine an access request to access at least one memory entry within the certain memory space;
access the at least one memory entry of the memory unit, if the access request complies with the memory credential; and
pin at least one physical memory page associated with the at least one memory entry during an access of the other virtual machine.

12. The system according to claim 11 wherein the intermediate entity performs the access without performing an operation selected from a list consisting of: context switch, interacting with an operating system and interfacing with a hypervisor.

13. The system according to claim 11 adapted to host the other virtual machine.

14. The system according to claim 11 wherein the intermediate entity is adapted to: receive a credential generation request from the virtual machine to generate for a component that is not directly utilized by the virtual machine, a memory credential associated with a memory space allocated to the virtual machine; generate, in response to the request, a cryptographically signed credential; store a mapping between the component and the cryptographically signed credential; receive from the component an access request to access at least one memory entry within the certain memory space; and utilize the mapping to retrieve a cryptographically signed credential that is associated with the component.

15. The system according to claim 14 wherein the intermediate entity generates the mapping between the component and the cryptographically signed credential; wherein the component is identified by a unique component identifier.

16. The system according to claim 11 comprising an interface that is coupled to the intermediate entity; wherein the intermediate entity communicates via the interface with another intermediate entity of another system.

17. The method according to claim 1 wherein the virtual machine and the other virtual machines reside on a same physical machine.

* * * * *